(12) United States Patent
Tew et al.

(10) Patent No.: US 12,475,223 B2
(45) Date of Patent: Nov. 18, 2025

(54) FILE PROTECTION USING AN EXTERNAL DATA STORAGE DEVICE

(71) Applicant: Sandisk Technologies, Inc., Milpitas, CA (US)

(72) Inventors: Wei Hong Tew, Penang (MY); Tze Ping Chan, Penang (MY); Jun Jeen Heng, Perak (MY)

(73) Assignee: Sandisk Technologies, Inc., Milpitas, CA (US)

( * ) Notice: Subject to any disclaimer, the term of this patent is extended or adjusted under 35 U.S.C. 154(b) by 62 days.

(21) Appl. No.: 18/622,917

(22) Filed: Mar. 30, 2024

(65) Prior Publication Data

US 2025/0307398 A1 Oct. 2, 2025

(51) Int. Cl.
*G06F 21/00* (2013.01)
*G06F 21/56* (2013.01)

(52) U.S. Cl.
CPC ...... *G06F 21/565* (2013.01); *G06F 2221/034* (2013.01)

(58) Field of Classification Search
CPC .......................... G06F 2221/034; G06F 21/565
USPC .......................................................... 726/23
See application file for complete search history.

(56) References Cited

U.S. PATENT DOCUMENTS

| 10,503,904 B1* | 12/2019 | Singh ..................... G06F 21/566 |
| 10,887,371 B2* | 1/2021 | Schneider ............... G06F 16/13 |
| 11,681,591 B2 | 6/2023 | Kulaga et al. |
| 2005/0120082 A1* | 6/2005 | Hesselink ........... H04L 63/0272 709/219 |
| 2012/0117650 A1* | 5/2012 | Nachenberg .......... G06F 21/562 726/24 |
| 2013/0254878 A1* | 9/2013 | Clarke .................... H04L 63/04 726/22 |
| 2018/0373722 A1 | 12/2018 | Ulasen et al. |
| 2020/0036731 A1* | 1/2020 | Bochare ................ H04L 63/145 |
| 2022/0083659 A1* | 3/2022 | Ma .......................... G06N 20/20 |
| 2022/0174078 A1* | 6/2022 | Yanagi .................. G06F 21/552 |

OTHER PUBLICATIONS

Acronis Cyber Protect Cloud, Advanced Backup, 5 pages, https://www.acronis.com/en-eu/products/cloud/cyber-protect/features/#backup.

* cited by examiner

*Primary Examiner* — Josnel Jeudy
(74) *Attorney, Agent, or Firm* — Crowell & Moring LLP

(57) ABSTRACT

A host system is configured to sequester protected data files to a separate data storage device. The host system includes an input device for receiving commands from a user, storage media for storing data files including the protected data files, a communication interface configured to communicate with the separate data storage device, and a network interface configured to communicate with a network server. The host system includes one or more processors configured, individually or in combination, to receive from the user, via the input device, a request to download a file from the network server. In response to determining that the file is a potential risk to the host system, the one or more processors are further configured, individually or in combination, to transfer the first subset of files to the separate data storage device and subsequent to transferring the first subset of files, complete downloading the file.

17 Claims, 5 Drawing Sheets

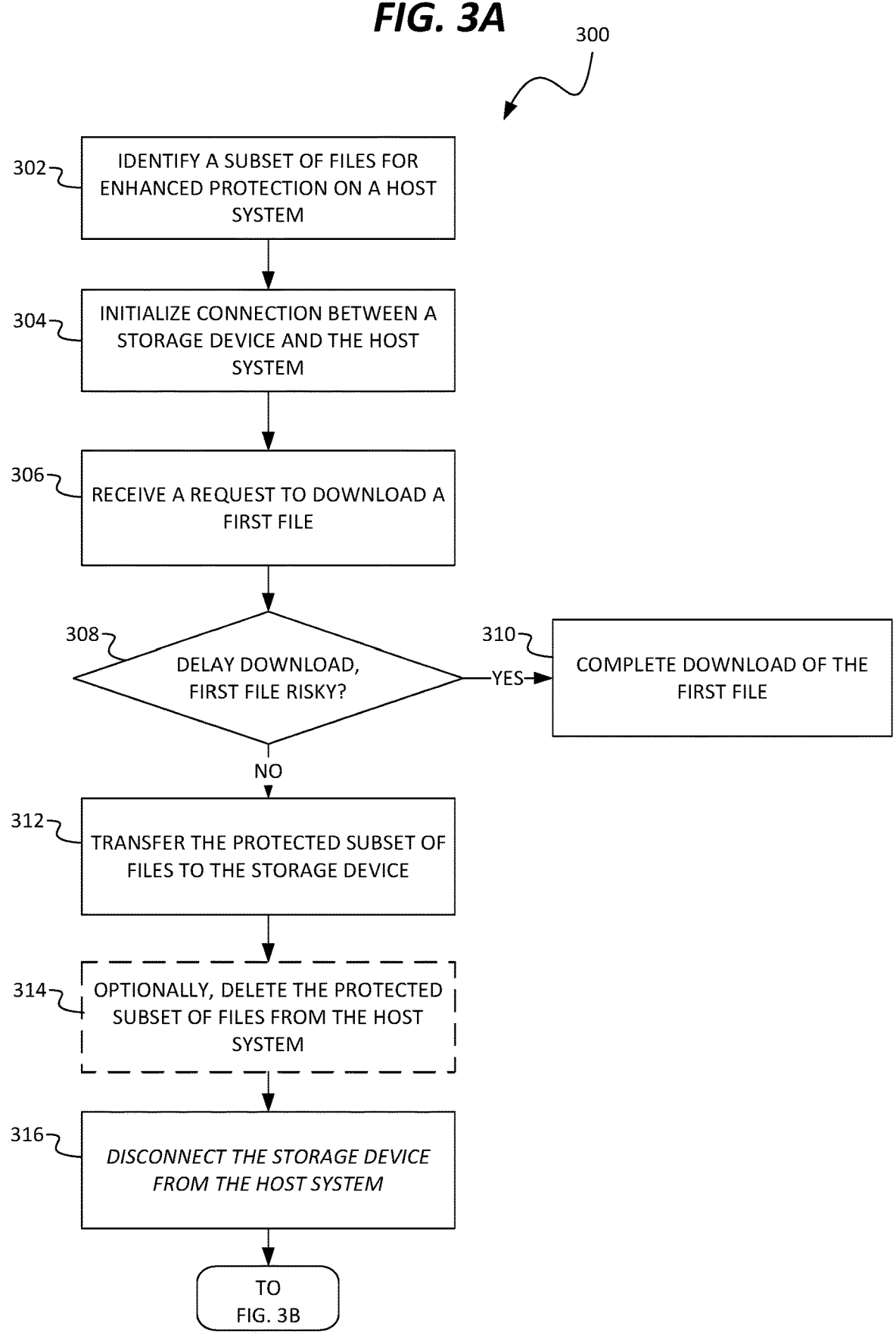

FILE PROTECTION USING AN EXTERNAL DATA STORAGE DEVICE

BACKGROUND

Field

This disclosure relates to protecting data files. More particularly, the disclosure relates to devices and methods for using an external data storage device to backup data stored on a computer.

Description of Related Art

Data protection can be accomplished using antivirus software and data backups. Antivirus software functions by employing several techniques to detect and mitigate malware threats on computers and devices. Some advanced antivirus programs isolate and analyze potentially malicious programs in a controlled environment through sandboxing techniques, while others improve detection rates by identifying patterns and characteristics of malware.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 3A-3B illustrate a block diagram representing a download process for the host system that sequesters protected data to a separate, external data storage device, according to certain embodiments.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Computer systems can utilize various security measures to protect user files and ensure their confidentiality, integrity, and availability. However, for personal computer systems that operate in the home, the available security measures that can be operated by the average user are much more limited. The main security measures used by at least some home users are anti-virus software and/or file backup to protect files.

For a more technologically knowledgeable home user, protecting data files can involve using a strategy that combines the use of backup and antivirus software. Firstly, antivirus software includes real-time protection features to monitor the computer system continuously for any suspicious activities or attempted malware intrusions. Additionally, implementing a regular backup schedule can be achieved by manually copying files to an external hard drive or using automated backup software that ensures data is backed up at scheduled intervals. Storing backups in an off-site location or utilizing cloud-based backup services protects against physical disasters and ensures data accessibility even if local hardware fails. Encrypting backup files adds another layer of security, making them unreadable to unauthorized users.

However, many home users don't have the technological knowledge to implement more complex security measures. These users can benefit from a security measure that is simpler to implement. In addition, certain types of attacks, such as data theft, are not well protected by data backup measures. One potential solution is a computer system that is configured to store important data or data selected for enhanced protection to an external data storage device in response to detecting the download of a file that is a potentially risk to the computer system. The protected data may be temporarily removed from the computer system so that attempts to copy or access that data fail. The protected data can then be restored back to the computer system from the external data storage device after verifying that the downloaded file is safe.

File Protection Using an External Storage Device

Figure 1:
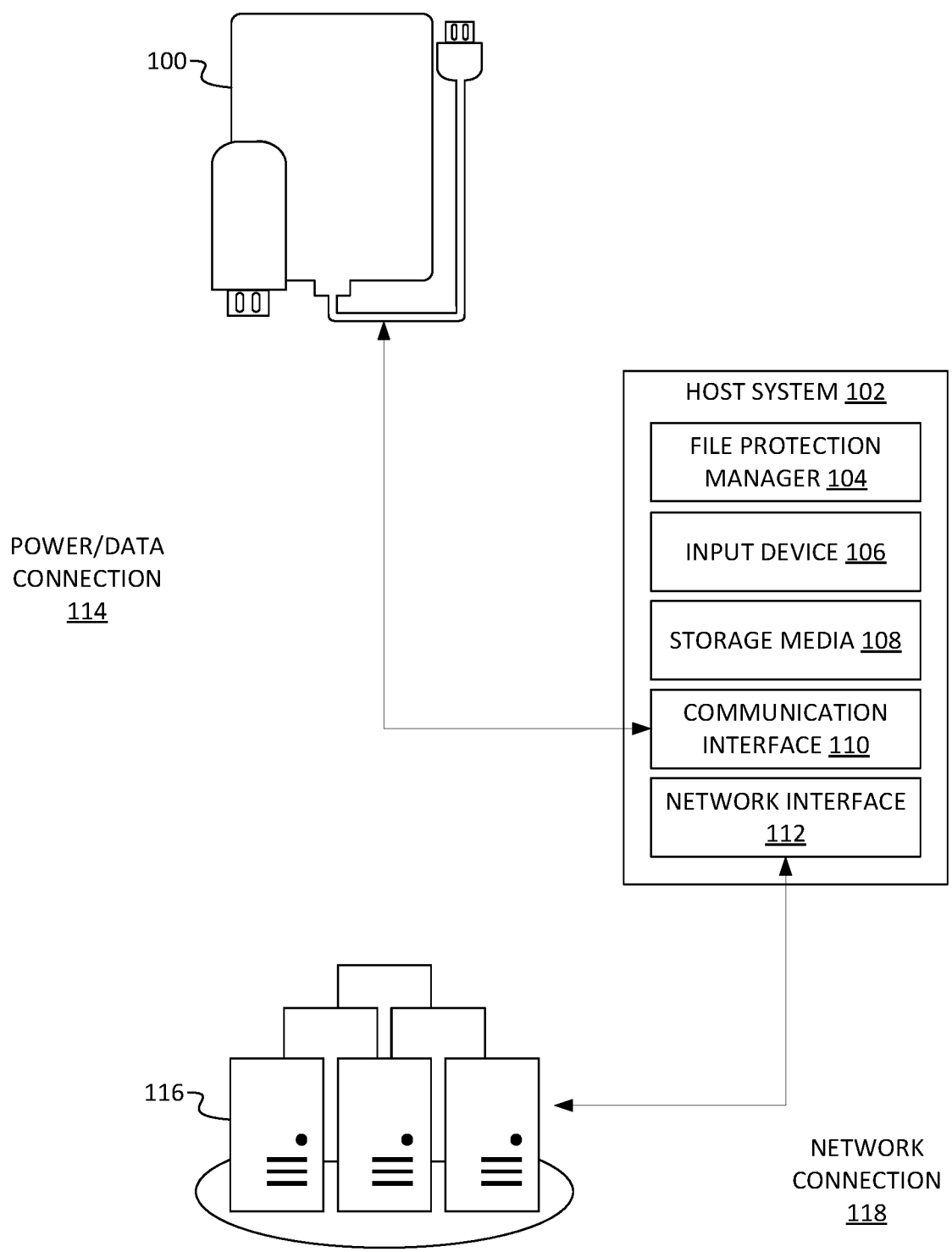
FIG. 1 illustrates a block diagram of a data storage device and a host system configured to protect files by sequestering important files in the data storage device prior to completing a download of a potentially risky file, according to certain embodiments.

FIG. 1 illustrates a block diagram of a data storage device 100 and a host system 102 configured to protect files by sequestering important files in the data storage device 100 prior to completing a download of a potentially risky file. The data storage device 100 is external to the host system 102, where the data storage device 100 is not permanently connected to the host system but can be connected/disconnected as needed. Various types of external data storage devices 100 can be used, where the data storage devices 100 are separate devices from the host system 102 that can be temporarily connected to the host system 102. The temporary connection can enable the data storage device to be disconnected from the host system 102, at times, for greater protection of the files stored on the data storage device.

The data storage devices 100 can receive power from the host system 102 and then receive the files from the host system over a power/data connection 114. The power/data connection 114 can provide a power and/or data connection between the data storage device 100 and a communication interface 110 of the host system 102

The host system 102 can include a file protection manager 104 that can identify important files, detect a file download, and transfer the important files to the data storage device 100 to protect the files from corruption, viruses, and/or data theft. The file protection manager may be a program, driver, browser extension, or the like that runs on one or more processors of the host system 102. The host system 102 can also include an input device for receiving commands from a user, such as commands for initiating file downloads or designating files for protection. The host system 102 can further include storage media 108 for storing data files, such as a solid-state drive (SSD), solid-state hybrid drive (SSHD), hard disk drive (HDD), or the like. The host system 102 can also include a communication interface 110 for providing a power and/or a data connection 114 to the data storage device 100. For example, the communication interface can be a universal serial bus (USB) port and associated controller. The host system 102 can further include a network interface 112, such as Wi-Fi or ethernet, to enable the host system 102 to receive data from network servers 116 from the Internet or other network over a network connection 118.

Figure 2A:
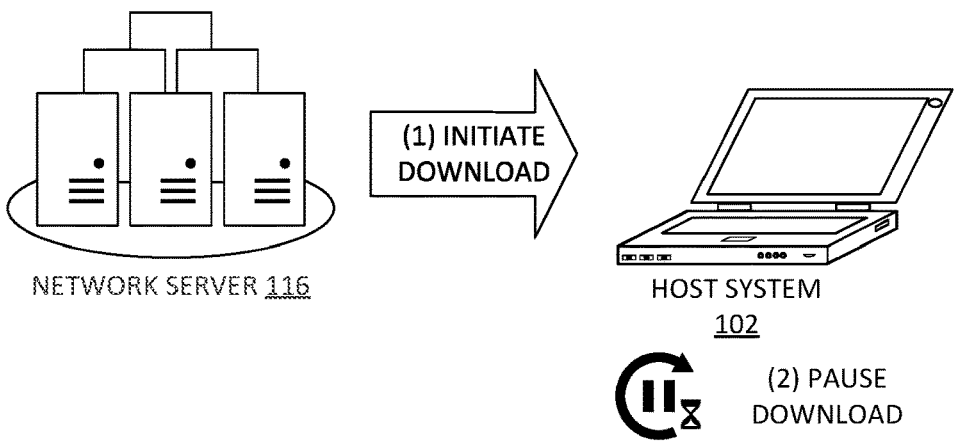
FIGS. 2A-2C are diagrams illustrating a transfer of selected files in response to a download of a risky file, according to certain embodiments, according to certain embodiments.
Figure 2B:
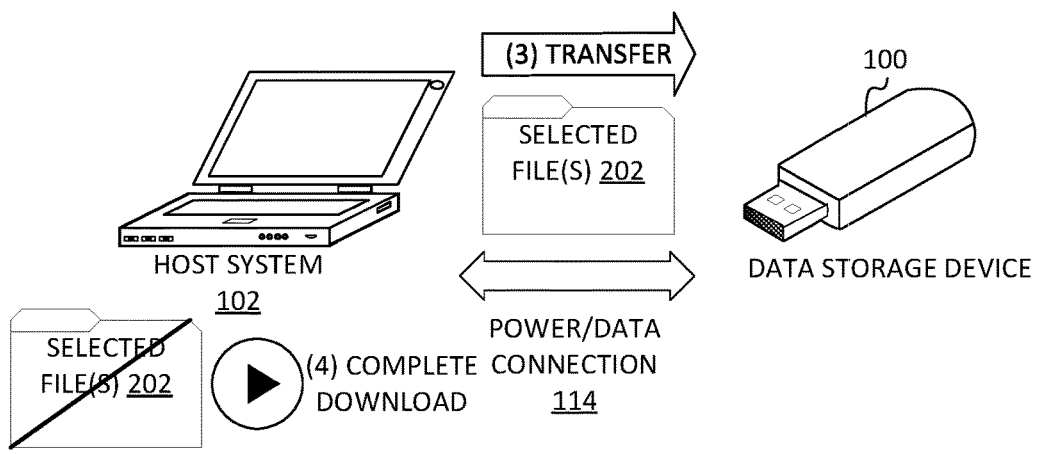
Figure 2C:
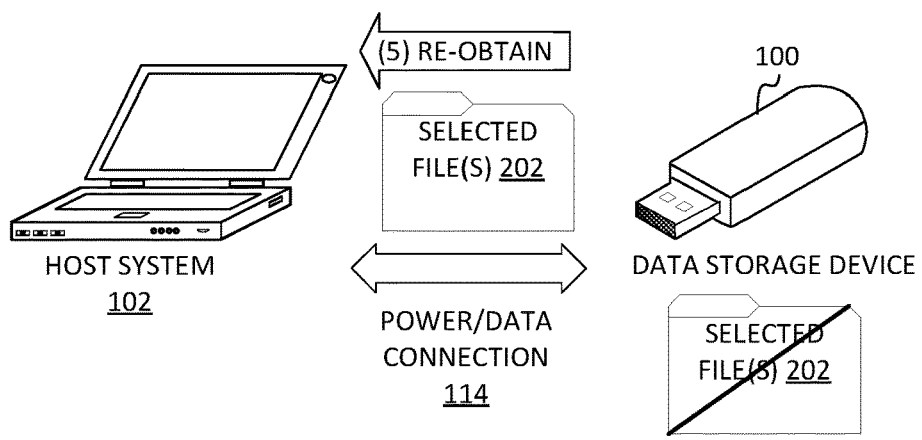

FIGS. 2A-2C are diagrams illustrating a transfer of selected files in response to a download of a risky file, according to certain embodiments. FIG. 2A illustrates a host system 102 in communication with a network server 116 (e.g. a web server, cloud service, etc.). The host system 102 can be connected to the network server 116 using any of various networking technologies, such as a network interface (ethernet, Wi-Fi, Bluetooth, etc.) and a network (e.g., wide area network, Internet, etc.). The host system 102 may be a computer, laptop, mobile device, or the like that is being used by a user to download and store files. In one scenario, the user of the host system 102 initiates a download of a file (shown as (1) initiate download in FIG. 2A). A file protection manager (shown in FIG. 4) on the host system 102 can detect that the file is a risky file and pause the download (shown as (2) pause download in FIG. 2A). The file protection manager may be a driver, application, or utility operating on the host system 102. For example, the file protection manager may be a file extension of a web browser that can scan downloaded files and control the download process.

FIG. 2B illustrates a transfer of selected files 202 from the host system 102 to a data storage device 100 while the download begun in FIG. 2A is paused (shown as (3) transfer in FIG. 2A). The transfer may be performed via a power and/or data connection 114, such as USB or other type of data connection. The data storage device 100 may be an external data storage device, such as a USB flash drive or external portable drive. Typically, the data storage device 100 receives power from the host system 102 via a physical connection that provides electrical power, such as USB. However, in a few implementations, it may be possible to store the selected files 202 in an external data storage device that is not physically connected to the host system 102, such as a network attached storage (NAS) device that has a data connection but not a power connection with the host system 102. For example, the NAS may be a device on a local area network (LAN) with the host system 102.

The selected files 202 may be chosen for enhanced protection using a variety of processes. For example, the selected files 202 may be manually selected by the user using a selection interface of the file protection manager. Alternatively, the file protection manager may track frequency of file usage and designate the most used (e.g., top 1000 files, top 500 files, most used files up to total size in megabytes (MB) of 100 MB/1,000 MB/10,000 MB etc.) as the selected files 202. In another alternative, the file protection manager may use a machine learning or artificial intelligence (AI) algorithm to designate the most important files to a user, based on the file usage on the host system 102. After the transfer of the selected files 202 are completed, the paused download can be continued and the download completed (shown as (4) complete download in FIG. 2B). In some implementations, the selected files 202 may be deleted from the host system 102. The selected files 202 may be kept only on the data storage device 100, which may also be disconnected from the host system 102 for additional protection. By deleting the files from the host system 102, the selected files 202 can be protected from being copied or otherwise accessed by unauthorized users in the event the downloaded file compromises the host system 102 is some way. For example, viruses that copy data or that can compromise the host system 102 to enable remote access by unauthorized users would not be able to get the selected files 202 that are only stored in the data storage device 100.

FIG. 2C illustrates the host system 102 re-obtaining the selected files 202 from the data storage device 100 (shown as (5) re-obtain in FIG. 2C). The selected files 202 can be transferred from the data storage device 100 to the host system 102 via the power/data connection 114. In some implementations, the copy of the selected files 202 in the data storage device 100 are deleted after the transfer to the host system 102. That way, it ensures that only one copy of the file exists, reducing the chances of unauthorized access of the data stored in the selected files 202.

As will be apparent, the above file protection system can be used with other security measures to protect the data. For example, cloud-based backup systems can be used to store copies of the files kept on the host system 102. Additionally, anti-virus software can be run on the host system 102. Utilizing overlapping security measures can create greater security for the data stored in the host system 102.

File Protection Process

Figure 3B:
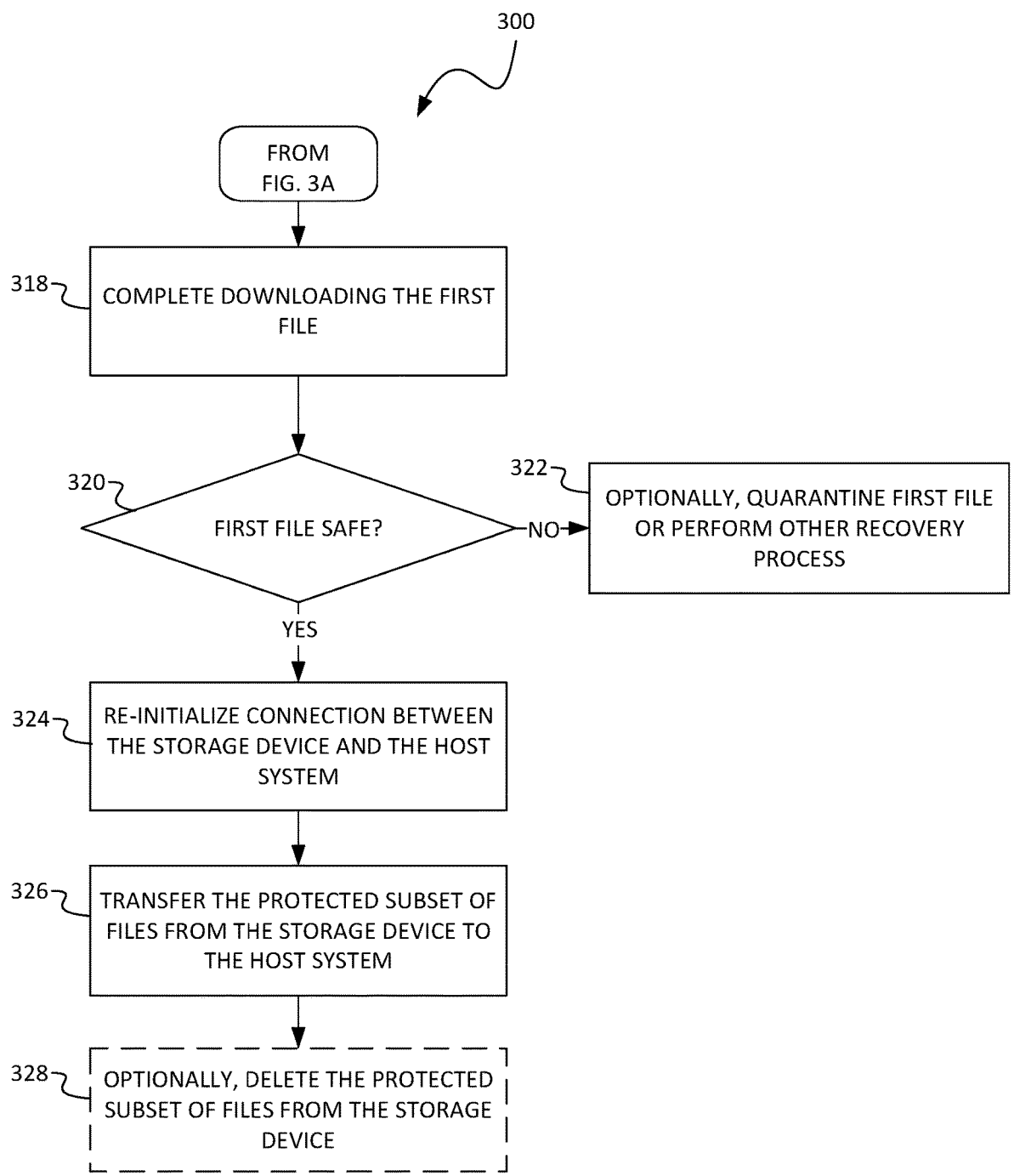

FIGS. 3A-3B illustrate a block diagram representing a download process 300 for a host system 102 that sequesters protected data files to a separate, external data storage device 100, according to certain embodiments. For ease of reference, the following discusses the download process in reference to the host system 102, data storage device 100, and other elements of FIGS. 1 and FIGS. 2A-2C, though it can be performed by other embodiments. Furthermore, the process may be performed by the host system 102 or one of its components, such as control circuitry, a processor, or a file protection manager 104.

At block 302, the host system 102 identifies a subset of files for enhanced protection (referred to as the selected files 202 in FIG. 2B). The selected files 202 may be chosen using a variety of processes. For example, the selected files 202 may be manually selected by the user using a selection interface of the file protection manager. Alternatively, the file protection manager may track the frequency of file usage and designate the most used as the selected files 202. In another alternative, the file protection manager may use a machine learning algorithm to designate the most important files to a user, based on the file usage on the host system 102.

At block 304, the host system 102 initializes a connection with the external data storage device 100. Prior to this, the data storage device 100 may be physically connected by a user to a data interface of the host system 102. The data interface may a USB port on the host system, directly connected port-to-port (e.g., flash drive inserted into a host USB port) or indirectly connected by a USB cable to another USB port on the data storage device 100. Other types of data interfaces can also be used, such as Lightning, Thunderbolt, external serial ATA (eSATA), Secure Digital (SD) reader, microSD reader, or the like.

Initializing the connection may involve a handshake or other negotiation process. For example, USB devices utilize USB enumeration to establish a connection. USB enumeration is a process that takes place when a USB device is connected to a computer or other host system. Upon connection, the USB controller on the host system detects the device and establishes its power requirements. The controller then communicates with the device to determine its supported USB speed, such as USB 2.0 or USB 3.0. Next, the USB device provides its Vendor ID (VID) and Product ID (PID) to the host, which helps the operating system (OS) identify the device and locate the appropriate device drivers.

The OS then checks its driver database or datastore and either prompts the user for driver installation or automatically installs the necessary driver for the device. Such a driver may be configured to enable the download process 300 to be performed by the host system. For example, the driver may cause the file protection manager 104 to be installed on the host system 102. Once the driver is loaded, the host OS configures the USB device by assigning resources and determining its capabilities. Endpoint allocation can then take place, where the host OS assigns logical channels (endpoints) for data transfer based on the device's defined interfaces. The OS notifies relevant applications or services about the connected device, enabling them to interact with the device using the appropriate Application Programming Interface (API). With the enumeration process complete, the USB device and the host computer are ready to exchange data through the allocated endpoints.

At block 306, the host system 102 receives a request to download a first file from a user of the host system 102. For example, the user may be using a web browser to view a website on the Internet. The user can then select a file to download from the website.

At block 308, the host system 102 delays the download of the first file to determine whether the first file is risky before completing download of the first file. The first file may be partially downloaded and then paused or the downloading process maybe paused before the first file begins downloading. Partially downloading the file can be useful for generating a signature from the partial download, where the signature can be compared to a database or datastore of risky files. By delaying the download, the host system 102 can transfer files for safe keeping to the external data storage device 100 before the first file can affect the host system 102.

If the host system 102 determines that the file is not risky, the host system 102 can complete the downloading of the file and proceed to block 310. At block 310, the first file is downloaded and the process 300 is completed. However, if the host system 102 determines that the file is risky, the host system 102 can transfer the protected subset of files to the external data storage device 100.

A variety of methods can be used to recognize potentially risky files that can pose a potential threat to computer systems. One method utilizes signature-based detection, where a security program scans files for specific patterns or signatures known to be associated with malware. These signatures are essentially unique fingerprints of malicious code that have been identified and cataloged by security researchers. These signatures are compared with a database or datastore of malware signatures. When a file matches a known signature, the security program flags it as potentially harmful.

Another method for identifying risky files is by tracking dangerous websites through the use of blacklists, which are databases or datastores containing URLs or domain names known to host malicious content or engage in malicious activities such as phishing, malware distribution, or scamming. These blacklists are compiled and maintained by security researchers, vendors, and community-driven initiatives. When users attempt to access a website, their web browsers or security software can compare against these blacklists to determine if the site is flagged as dangerous. If the first file is being downloaded from a website on one of these blacklists, the host system 102 can designate the first file as a risky file. Using the website to determine when the first file should be considered risky has the added benefit of not requiring even a partial download of the first file, which can enhance security.

At block 312, the host system 102 transfers the protected subset of files to the external data storage device 100. In one scenario, the transfer may be accomplished through a USB interface connecting the external data storage device 100 to the host system 102.

The larger the total size of the protected subset of files, the longer the transfer takes. The longer the transfer, the more disruptive the delay in downloading the first file is to the user experience. This serves as a soft limit on how many total megabytes can be in the protected subset of files. This soft limit is a function of the size of the total file size of the protected subset of files and the transfer speed of the data to the external data storage device 100. For example, USB 3.0 has a maximum transfer speed of 5 gigabits per second (Gbits/s). In this example, the target size of the protected subset of files depends on the delay allowable, assuming maximum transfer speed. For example, a target delay of 20 seconds would lead to a target size of 100 Gigabits. In this example, a number of files can be designated for enhanced protection until the total size of the number of files reaches the target size. As will be apparent, the size and/or the number of the protected subset of files can change depending on the transfer speed of the underlying technology or the allowable delay. Some example allowable delays can include 1 second, 10 seconds, 20 seconds, 30 seconds, 60 seconds, 2 minutes, 5 minutes, and the like, including numbers between and around the given examples.

At block 314, the host system 102 can, optionally, delete the protected subset of files from its own storage medium, leaving the protected subset of files only on the data storage device 100. By keeping the subset of files only in the data storage device 100, the subset of files can be protected from any malicious software the runs on the host system 102. Such malicious software may be hidden in the first file that is being downloaded. For example, if the first file is infected with a program that transfers files to a hacker, removing the subset of files from the host system 102 prevents such a transfer from occurring.

At block 316, the host system 102 can be disconnected from the external data storage device 100. For example, the user may physically unplug a USB data storage device from the host system 102. As the unplugged USB data storage device is now unpowered, any files stored on the USB data storage device become inaccessible to any sort of malware running on the host system 102. The host system 102 may also disconnect the data storage device 100 through a software process, such as by dismounting the data storage device 100. When a data storage device is unmounted or ejected from the operating system, the data storage device becomes inaccessible for read or write operations.

At block 318 (shown in FIG. 3B), the host system 102 completes downloading the first file. The first file is then stored in the storage media 108 of the host system 102.

At block 320, the host system 102 determines if the first file is safe. If the first file is not safe, the download process 300 proceeds to block 322. At block 322, optionally, the host system 102 can quarantine the first file or otherwise perform a recovery process to make the host system 102 safe.

If the first file is safe, the process 300 proceeds to block 324. At block 324, the host system 102 reinitializes the connection between the data storage device 100 and the host system 102. Re-initializing the connection may involve a handshake or other negotiation process. For example, USB devices utilize USB enumeration to establish a connection, as described above. Reinitializes the connection may be performed subsequent to the user physically reconnecting the data storage device 100 to the host system 102.

At block 326, the host system 102 transfers the protected subset of files from the data storage device to the host system. In one scenario, the transfer may be accomplished through a USB interface connecting the external data storage device 100 to the host system 102.

At block 328, the host system 102 may, optionally, delete the protected subset of files from the data storage device 100. Deleting the subset of files from the data storage device 100 can provide greater security by limiting access to the number of copies that can be access by an unauthorized user. The process 300 may then end.

Example Data Storage Device and Host System

Figure 4:
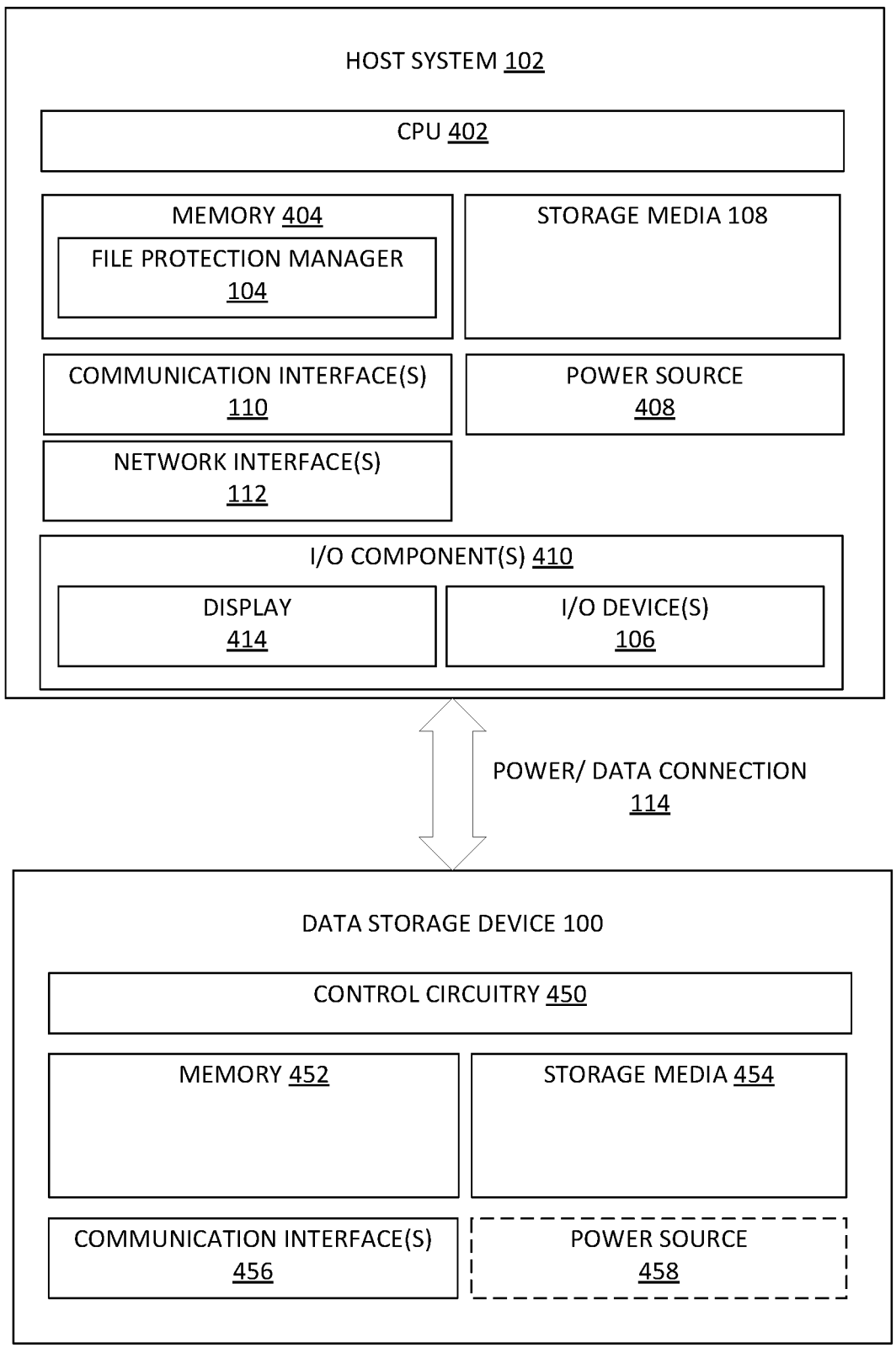
FIG. 4 illustrates a block diagram providing example details of the data storage device and the host system, according to certain embodiments.

FIG. 4 illustrates example details of the data storage device 100 and the host system 102, according to certain embodiments. As illustrated, the host system 102 can include one or more of the following components, devices, modules, and/or units (referred to herein as "components"), either separately/individually and/or in combination/collectively: one or more central processing units (CPUs) 402 or other type of processor, memory 404, one or more communication interfaces 110, a power source 408 (e.g., battery or power supply unit), and/or one or more I/O components 410.

In some embodiments, the host system 102 can comprise a housing/enclosure configured and/or dimensioned to house or contain at least part of one or more of the components of the host system 102. In some embodiments, the storage media 108 may be housed internally in the enclosure of the host system 102. For example, the host system 102 may be a server or desktop system in case or rack mount enclosure with one or more storage drives in the case or enclosure. The host system 102 may be in a first enclosure, while the data storage device 100 may be external to the host system, being in a second enclosure different from the first enclosure.

The memory 404 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 402 to quickly retrieve and manipulate the information it needs to perform tasks.

The memory 404 can include programs that are running on the host system 102, such as a file protection manager 104. The file protection manager can identify important files, detect a file download, and/or transfer the important files to the data storage device 100 to protect the files from corruption, viruses, and/or data theft. The file protection manager may be a program, driver, browser extension, or the like that runs on a processor of the host system 102.

In addition, the host system 102 may also include non-volatile memory or storage media 108 for permanently storing data, such as important files. The storge media 108 may be an internal storage drive, such as an SSD, SSHD, or HDD. A permanent copy of the file protection manager 104 can be stored in the storage media 108 and then copied to memory 404 for running the program.

The one or more communication interfaces 110 can be a data interface that includes connectors, cables, and/or protocols for connection, communication, and/or power supply between host systems and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 100, forming a power/data connection 114 with the data storage device 100.

The power source 408 can be configured to provide/manage power for the host system 102. The power source 408 can comprise one or more devices and/or circuitry configured to provide a source of power and/or provide power management functionality. Moreover, in some embodiments the power source 408 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 410 can include a variety of components to receive input and/or provide output. The one or more I/O components 410 can be configured to receive touch, speech, gesture, biometric data, or any other type of input. For example, the one or more I/O components 410 can be used to provide input regarding control of the host system 102, such as opening files, entering logins, plays, and/or changing settings. As shown, the one or more I/O components 410 can include a display 414 configured to display data and various user interfaces. The display 414 can include one or more liquid-crystal displays (LCD), light-emitting diode (LED) displays, organic LED displays, plasma displays, electronic paper displays, and/or any other type(s) of technology. In some embodiments, the display 414 can include one or more touchscreens configured to receive input and/or display data. Further, the one or more I/O components 410 can include the one or more input/output devices 106, which can include a touchscreen, touch pad, controller, mouse, keyboard, wearable device (e.g., optical head-mounted display), virtual or augmented reality device (e.g., head-mounted display), etc.

As illustrated, the data storage device 100 can include one or more of the following components, devices, modules, and/or units (referred to herein as "components"), either separately/individually and/or in combination/collectively: control circuitry 450, storage media 452, communication interfaces 456, and/or optionally a power source 458 (e.g., battery or power supply unit). In some embodiments, the data storage device 100 can comprise a housing/enclosure configured and/or dimensioned to house or contain the components of the data storage device 100. In some examples, the data storage device 100 does not have its own power source but receives power only from the host system 102 via the power/data connection 114.

The data storage device 100 may be an external storage drive, SD card, flash drive, or a USB memory stick that uses semiconductor memory as the storage media. For example, the data storage device 100 may be an external drive that is connected to the host system 102 via an external port, such as USB. In other examples, the data storage device 100 may be an SD card, a microSD card, or another type of flash card that is readable from a memory reader of the host system 102. In other implementations, the data storage device 100 may be an external storage drive that uses an HDD that uses magnetic disks as the storage media, an SSHD that uses a combination of semiconductor memory and magnetic disk technology, or a tape drive that uses tape media.

Although certain components of the data storage device 100 and host system 102 are illustrated in FIG. 4, it should be understood that additional components not shown can be included in embodiments in accordance with the present disclosure. Furthermore, certain of the illustrated components can be omitted in some embodiments. Although the control circuitry 450 is illustrated as a separate component, it should be understood that any or all of the remaining components of the data storage device 100 can be embodied at least in part in the control circuitry 450. That is, the control circuitry 450 can include various devices (active and/or passive), semiconductor materials and/or areas, layers, regions, and/or portions thereof, conductors, leads, vias, connections, and/or the like, wherein one or more of the other components of the data storage device 100 and/or portion(s) thereof can be formed and/or embodied at least in part in/by such circuitry components/devices.

The various components of the data storage device 100 can be electrically and/or communicatively coupled using certain connectivity circuitry/devices/features, which can or may not be part of the control circuitry 450. For example, the connectivity feature(s) can include one or more printed circuit boards configured to facilitate mounting and/or interconnectivity of at least some of the various components/circuitry of the data storage device 100. In some embodiments, two or more of the control circuitry 450, the storage media 452, the communication interface(s) 456, and/or the power source 458, can be electrically and/or communicatively coupled to each other.

The storage media 454 can utilize various types of non-volatile memory (NVM) to permanently store data. NVM is a type of computer memory that can retain stored information even after power is removed. For example, the storage media 454 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

The one or more communication interfaces 456 can be configured to communicate with one or more device/sensors/systems. For example, the one or more communication interfaces 456 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 456 can be a data interface that includes connectors, cables, and/or protocols for connection, communication, and/or power supply between the host system 102 and the data storage device 100. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 100, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 102, forming the power/data connection 114.

The optional power source 458 can be configured to provide/manage power for the data storage device 100. In some embodiments, the power source can include one or more batteries, such as a lithium-based battery, a lead-acid battery, an alkaline battery, and/or another type of battery. In some embodiments the power source 458 includes a mains power connector that is configured to couple to an alternating current (AC) or direct current (DC) mains power source. However, in some embodiments, the data storage device 100 may not include an internal power source but be configured to receive power through the communication interface 456, such as via a USB connection.

The term "control circuitry" is used herein according to its broad and ordinary meaning, and can refer to any collection of one or more processors, processing circuitry, processing modules/units, chips, dies (e.g., semiconductor dies including come or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. They may be configured to work individually or in combination. Control circuitry can further comprise one or more data storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic data storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

ADDITIONAL EMBODIMENTS

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer data storage device or collection of data storage devices. Some or all of the methods may alternatively be embodied in specialized computer hardware.

What is claimed is:

1. A host system comprising:
an input device configured to receive commands from a user;
storage media configured to store data files, the data files including a first subset of files designated for enhanced protection;
a communication interface configured to communicate with a first data storage device that is a separate device from the host system;
a network interface configured to communicate with a network server, and
one or more processors configured, individually or in combination, to:
initialize a connection with the first data storage device via the communication interface;
receive, from the user via the input device, a request to download a first file from the network server,
initiate downloading of the first file via the network interface; and
in response to determining that the first file is a potential risk to the host system:
pause the downloading of the first file;
transfer the first subset of files to the first data storage device; and
subsequent to transferring the first subset of files;
remove the connection with the first data storage device;
delete the first subset of files from the storage media;
complete downloading the first file;
determine that the first file is not a risk to the host system:
re-initialize the connection with the first data storage device via the communication interface; and
transfer the first subset of files from the first data storage device to the storage media.

2. The host system of claim 1, the one or more processors further configured, individually or in combination, to:
delete the first subset of files from the first data storage device subsequent to transferring from the first data storage device to the storage media.

3. The host system of claim 1, wherein determining that the first file is a potential risk comprises comparing a signature from the first file with a data store of signatures of dangerous files.

4. The host system of claim 1, the one or more processors further configured, individually or in combination, to:
designate a first selected file for the enhanced protection and part of the first subset of files based on a selection made by the user.

5. The host system of claim 1, the one or more processors further configured, individually or in combination, to:
designate a first selected file for the enhanced protection and part of the first subset of files based on a frequency of use of the first file.

6. The host system of claim 1, the one or more processors further configured, individually or in combination, to:
operate an artificial intelligence (AI) program to identify one or more files of the first subset of files based at least in part on importance to the user.

7. The host system of claim 1, wherein the first subset of files comprises a number of files that can be transferred in under 60 seconds.

8. The host system of claim 1, wherein the first subset of files comprises a number of files that can be transferred in under 10 seconds.

9. The host system of claim 1, wherein the first data storage device is an external storage drive.

10. A method for sequestering protected data files to a separate data storage device from a host system, the method comprising:
identifying a first subset of files stored in a storage media of the host system that are designated for enhanced protection;
initializing a connection with the separate data storage device;
receiving from a user, via in input device of the host system, a request to download a first file from a network server;
initiating downloading of the first file; and in response to determining that the first file is a potential risk to the host system:
  pausing the downloading of the first file;
  transferring the first subset of files to the separate data storage device; and
  subsequent to transferring the first subset of files:
    removing the connection with the separate data storage device;
    deleting the first subset of files from the storage media;
    completing downloading the first file;
    determining that the first file is not a risk to the host system:
      re-initializing the connection with the separate data storage device; and
      transferring the first subset of files from the separate data storage device to the storage media.

11. The method of claim 10, further comprising:
deleting the first subset of files from the separate data storage device subsequent to transferring from the separate data storage device to the storage media.

12. The method of claim 10, wherein determining that the first file is a potential risk comprises comparing a signature from the first file with a data store of signatures of dangerous files.

13. The method of claim 10, wherein determining that the first file is a potential risk comprises operating an artificial intelligence (AI) program to identify potentially risky files.

14. The method of claim 10, further comprising:
subsequent to transferring the first subset of files to the separate data storage device, deleting the first subset of files from the storage media.

15. A host system configured to sequester protected data files to a separate data storage device, the host system comprising:
  means for receiving commands from a user,
  means for storing data files, the data files including a first subset of files designated for an enhanced protection level;
  means for communicating with a first data storage device that is a separate device from the host system, and
  one or more processors configured, individually or in combination, to:
    initialize a connection with the first data storage device via the communication interface;
    receive, from the user via the means for receiving commands, a request to download a first file from a network server;
    initiate downloading of the first file via the network interface; and
    in response to determining that the first file is a potential risk to the host system:
      pause the downloading of the first file;
      transfer the first subset of files to the first data storage device; and
      subsequent to transferring the first subset of files;
        remove the connection with the first data storage device;
        delete the first subset of files from the storage media;
        complete downloading the first file;
        determine that the first file is not a risk to the host system:
          re-initialize the connection with the first data storage device via the communication interface; and
          transfer the first subset of files from the first data storage device to the storage media.

16. The host system of claim 1, wherein the communication interface comprises a universal serial bus (USB) interface.

17. The method of claim 10, wherein the first data storage device is an external storage drive.

* * * * *